United States Patent
Kondos et al.

(10) Patent No.: US 6,979,714 B2
(45) Date of Patent: *Dec. 27, 2005

(54) ADHESION PROMOTING AGENT AND COATING COMPOSITIONS FOR POLYMERIC SUBSTRATES

(75) Inventors: Constantine A. Kondos, Pittsburgh, PA (US); Jonathan T. Martz, Glenshaw, PA (US); Masayuki Nakajima, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 69 days.

This patent is subject to a terminal disclaimer.

(21) Appl. No.: 10/404,289

(22) Filed: Apr. 1, 2003

(65) Prior Publication Data

US 2003/0212209 A1 Nov. 13, 2003

Related U.S. Application Data

(63) Continuation of application No. 09/564,175, filed on May 3, 2000, now Pat. No. 6,593,423.

(51) Int. Cl.$^7$ .......................................... C09D 119/00
(52) U.S. Cl. ................ 525/191; 525/206; 525/207; 525/213; 525/240
(58) Field of Search ................ 525/63, 69, 240, 525/191, 206, 207, 213

(56) References Cited

U.S. PATENT DOCUMENTS

| | | | |
|---|---|---|---|
| RE27,145 E | 6/1971 | Jones | 260/880 |
| 3,652,732 A | 3/1972 | Makowski et al. | 260/880 B |
| 3,979,547 A | 9/1976 | Roberts, Jr. et al. | 428/423 |
| 4,020,125 A | 4/1977 | Suzuki et al. | 260/859 R |
| 4,039,593 A | 8/1977 | Kamienski et al. | 260/635 E |
| 4,093,593 A | 6/1978 | Go | 260/45.85 P |
| 4,147,688 A | 4/1979 | Makhlouf et al. | 260/33.6 EP |
| 4,181,644 A | 1/1980 | Lehr | 260/42.18 |
| 4,518,753 A | 5/1985 | Richards et al. | 526/177 |
| 4,764,430 A | 8/1988 | Blackburn et al. | 428/413 |
| 4,866,120 A | 9/1989 | Rudnick et al. | 524/849 |
| 4,997,882 A | 3/1991 | Martz et al. | 525/65 |
| 5,039,755 A | 8/1991 | Chamberlain et al. | 525/338 |
| 5,115,007 A | 5/1992 | Chihara et al. | 524/267 |
| 5,130,373 A | 7/1992 | Ashihara et al. | 525/193 |
| 5,135,984 A | 8/1992 | Kinosada et al. | 525/193 |
| 5,143,976 A | 9/1992 | Ashihara et al. | 525/227 |
| 5,214,101 A | 5/1993 | Pettit, Jr. et al. | 525/176 |
| 5,221,707 A | 6/1993 | Chihara et al. | 524/267 |
| 5,319,032 A * | 6/1994 | Martz et al. | 525/301 |
| 5,358,981 A | 10/1994 | Southwick | 523/402 |
| 5,376,745 A | 12/1994 | Handlin, Jr. et al. | 526/178 |
| 5,378,761 A | 1/1995 | St. Clair | 525/111 |
| 5,397,602 A | 3/1995 | Martz et al. | 427/343.5 |
| 5,405,911 A | 4/1995 | Handlin, Jr. et al. | 525/139 |
| 5,416,168 A | 5/1995 | Willis et al. | 525/333.2 |
| 5,436,079 A | 7/1995 | Brugel | 428/483 |
| 5,446,104 A | 8/1995 | Handlin, Jr. et al. | 525/314 |
| 5,459,200 A | 10/1995 | St. Clair | 525/131 |
| 5,486,570 A | 1/1996 | St. Clair | 525/123 |
| 5,500,481 A | 3/1996 | St. Clair | 525/92 K |
| 5,543,200 A | 8/1996 | Hargis et al. | 428/122 |
| 5,554,691 A | 9/1996 | St. Clair | 525/111 |
| 5,594,072 A | 1/1997 | Handlin, Jr. et al. | 525/314 |

(Continued)

FOREIGN PATENT DOCUMENTS

| | | |
|---|---|---|
| EP | 0 601 665 | 6/1994 |
| EP | 0 698 638 | 2/1996 |
| JP | 58145712 | 8/1983 |
| JP | 90036617 | 8/1990 |
| JP | 91062190 | 9/1991 |
| JP | 4046904 | 2/1992 |
| JP | 4161402 | 6/1992 |
| JP | 4218549 | 8/1992 |
| JP | 6-16746 | 1/1994 |
| JP | 94033326 | 5/1994 |
| JP | 6-179850 | 6/1994 |
| JP | 6-179849 | 7/1994 |
| JP | 95002932 | 1/1995 |
| JP | 95047719 | 5/1995 |
| JP | 5025405 | 2/1996 |
| JP | 2681436 | 11/1997 |
| WO | WO96/11238 | 4/1996 |
| WO | WO96/11241 | 4/1996 |

OTHER PUBLICATIONS

D. St. Clair, "Coating Resins based on Melamine Cured Polyolefin Diol" Technical Paper presented at TPO's in Automotive '96 Conference, Executive Conference Management (Oct. 28-30, 1996), Novi, Michigan.

M. Mikulec, Are the Low Viscosity Functionalized Olefinic Polymers Feasible as Components in Coatings to Adhere to Untreated TPO Substrate? (1996).

U.S. Appl. No. 09/212,784, filed Dec. 16, 1998 entitled "Coating Composition for Plastic Substrates".

*Primary Examiner*—Jeffrey Mullis
(74) *Attorney, Agent, or Firm*—Deborah M. Altman

(57) ABSTRACT

The present invention provides an adhesion promoting agent which includes a graft copolymer formed by a halogenated polyolefin polymer with at least one reactive functionality and a substantially saturated hydrocarbon polymer having more than one reactive functionality. At least one reactive functionality of the saturated hydrocarbon polymer is reactive with the reactive functionality of the halogenated polyolefin to form the graft copolymer of the invention.

13 Claims, No Drawings

U.S. PATENT DOCUMENTS

| | | | |
|---|---|---|---|
| 5,612,407 A | 3/1997 | Southwick | 524/571 |
| 5,721,317 A | 2/1998 | St. Clair et al. | 525/98 |
| 5,863,646 A | 1/1999 | Verardi et al. | 428/323 |
| 6,001,469 A | 12/1999 | Verardi et al. | 428/333 |
| 6,203,913 B1 | 3/2001 | Kondos et al. | 428/423.1 |
| 6,593,423 B1 * | 7/2003 | Kondos et al. | 525/63 |

* cited by examiner

US 6,979,714 B2

ADHESION PROMOTING AGENT AND COATING COMPOSITIONS FOR POLYMERIC SUBSTRATES

CROSS REFERENCE TO RELATED PATENT APPLICATION

This application is a continuation of U.S. patent application Ser. No. 09/564,175 filed May 3, 2000 now U.S. Pat. No. 6,593,423, which is herein incorporated by reference in its entirety. This patent application is also related to U.S. patent application Ser. No. 09/212,784 entitled "Coating Composition for Plastic Substrates", filed Dec. 16, 1998, which is herein incorporated by reference.

FIELD OF THE INVENTION

The present invention relates to an adhesion promoting agent, to coating compositions utilizing the adhesion promoting agent for coating thermoplastic and thermosetting polymeric materials, and to the coated polymeric materials.

BACKGROUND OF THE INVENTION

Polymeric materials, such as thermoplastic polyolefin (TPO) and reaction injected molding urethane (RIM), are useful in many applications, such as automobile parts and accessories, containers, household appliances and other commercial items. It is often desirable to coat articles made from such polymeric materials with organic coating compositions to decorate or protect them from degradation when exposed to atmospheric weathering conditions such as sunlight, moisture, heat and cold. To achieve longer lasting and more durable parts, it is important for the coatings to be tightly adhered to the surface of the article.

Polymeric substrates made from a variety of thermoplastic and thermosetting materials have widely varying surface properties, including surface tension, roughness and flexibility, which make strong adhesion of organic coatings difficult, particularly after aging or environmental exposure of the coated polymeric materials. To facilitate adhesion of organic coatings to polymeric substrates, the substrate can be pretreated using an adhesion promoter layer or tie coat, e.g., a thin layer about 0.25 mils (6.35 microns) thick, or by flame or corona pretreatment. For automotive applications, it is important that the coating composition and/or adhesion promoter layer is resistant to fuel damage, i.e. maintains good adhesion of the coating to the substrate even if fuel is accidentally spilled onto the coated substrate.

Typically, adhesion promoter layers used on TPO surfaces contain chlorinated polyolefins, some examples of which are described in U.S. Pat. Nos. 4,997,882; 5,319,032; and 5,397,602, herein incorporated by reference. However, chlorinated polyolefins provide some processing limitations. For example, while chlorinated polyolefins are soluble in aromatic solvents, THF, and chlorinated solvents, they are not readily soluble in solvents such as alcohols, ketones, or esters which are preferred for use in coating compositions. Further, conventional chlorinated polyolefins typically have no curing or crosslinking sites and therefore must be used at high molecular weights to have a positive effect on coating strength.

Coating compositions that exhibit acceptable adhesion directly to polymeric materials, such as TPO and RIM, without the use of separate adhesion promoter layers or tie coats have been developed. For example, polyolefin diols have been used in coating compositions to improve adhesion to polymeric substrates without the use of separate adhesion promoter layers or tie coats. For example, U.S. Pat. No. 6,001,469, herein incorporated by reference, discloses a coating composition containing a saturated polyhydroxylated polydiene polymer having terminal hydroxyl groups.

U.S. Pat. No. 5,863,646, herein incorporated by reference, discloses a liquid adhesion promoting coating composition having a blend of a saturated polyhydroxylated polydiene polymer and a chlorinated polyolefin.

Coating compositions having reacted adhesion promoters have also been developed. For example, U.S. Pat. No. 5,135,984 discloses a coating composition having an adhesion promoting material obtained by reacting a chlorinated polyolefin, maleic acid anhydride, acryl or methacryl modified hydrogenated polybutadiene containing at least one acryloyl group or methacryloyl group per unit molecule, and organic peroxide.

JP 6-16746 discloses a resin coating composition having either a polydiene and acryl-based oligomer or a polyester-based oligomer grafted onto a chlorinated polyolefin.

While these known adhesion promoting compositions are generally acceptable for commercial applications, they tend to either have good adhesion to polymeric substrates with poor to moderate fuel resistance; good fuel resistance but with commercially acceptable adhesion to only a narrow range of polymeric substrate types; or good adhesion and good fuel resistance but only at high levels of chlorinated polyolefin resulting in high VOC.

It would be desirable to provide an adhesion promoting agent that could be used either in an adhesion promoter layer or as an ingredient in a coating composition that improves coating adhesion to polymeric substrates and also provides adequate fuel resistance for automotive applications.

SUMMARY OF THE INVENTION

An adhesion promoting agent of the invention comprises a graft copolymer comprising (i) a halogenated polyolefin polymer having at least one reactive functionality, and (ii) a substantially saturated hydrocarbon polymer having more than one reactive functionality, at least one reactive functionality of the hydrocarbon polymer being reactive with the reactive functionality of the halogenated polyolefin.

An adhesion promoting agent for promoting the adhesion of a coating onto a surface of a polymeric substrate comprises a graft copolymer comprising (i) a chlorinated polypropylene polymer having at least one reactive functionality selected from the group consisting of anhydride, carboxylic acid, hydroxyl, epoxy, and isocyanate; and (ii) a substantially saturated polybutadiene polymer having more than one reactive functionality. At least one reactive functionality of the polybutadiene polymer is reactive with the reactive functionality of the chlorinated polypropylene polymer and is selected from the group consisting of hydroxyl, amine, carboxylic acid, epoxy, and isocyanate.

A coating composition of the invention comprises (a) at least one crosslinkable film-forming material and (b) an adhesion promoting agent. The adhesion promoting agent comprises a graft copolymer comprising (i) a halogenated polyolefin polymer having at least one reactive functionality; and (ii) a substantially saturated hydrocarbon polymer having more than one reactive functionality, at least one reactive functionality of the hydrocarbon polymer being reactive with the reactive functionality of the halogenated polyolefin.

A coated article of the invention comprises a polymeric substrate and a coating deposited over at least a portion of the substrate. The coating is formed from a coating composition comprising (a) at least one crosslinkable film-forming material; and (b) an adhesion promoting agent. The adhesion promoting agent comprises a graft copolymer comprising (i) a halogenated polyolefin polymer having at least one reactive functionality; and (ii) a substantially saturated hydrocarbon polymer having more than one reactive functionality, at least one reactive functionality of the hydrocarbon polymer being reactive with the reactive functionality of the halogenated polyolefin.

A method of promoting the adhesion of a coating to a polymeric substrate comprises applying a coating composition to a surface of a polymeric substrate, the coating composition comprising an adhesion promoting agent comprising a graft copolymer comprising (i) a halogenated polyolefin polymer having at least one reactive functionality; and (ii) a substantially saturated hydrocarbon polymer having more than one reactive functionality, at least one reactive functionality of the hydrocarbon polymer being reactive with the reactive functionality of the halogenated polyolefin polymer.

The present invention also provides polymeric articles coated with the coating compositions of the invention.

DESCRIPTION OF THE PREFERRED EMBODIMENTS

Other than in the operating examples or where otherwise specified, all numbers expressing quantities of ingredients, reaction conditions, and so forth used in the specification and claims are to be understood as being modified in all instances by the term "about".

As used herein, the term "polymer" is meant to refer to oligomers and both homopolymers and copolymers. Any numeric references to amounts, unless otherwise specified, are "by weight". Molecular weight quantities, whether Mn or Mw, are those determinable from gel permeation chromatography using polystyrene as a standard. The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer. The theoretical polymer weight is divided by the theoretical number to give the equivalent weight. For example, hydroxyl equivalent weight is based on the equivalents of reactive pendant and/or terminal hydroxyl groups in the hydroxyl-containing polymer.

An adhesion promoting agent of the invention includes a graft copolymer prepared from one or more of the following reactants: (a) a halogenated polyolefin polymer having at least one reactive functionality and (b) a substantially saturated hydrocarbon polymer having more than one reactive functionality, at least one reactive functionality of the saturated hydrocarbon polymer being reactive with the reactive functionality of the halogenated polyolefin.

Useful halogenated polyolefin polymers for forming the graft copolymer include one or more halogen atoms, such as fluorine, chlorine, bromine, or iodine. Chlorine is presently preferred. Suitable halogenated polyolefins include halogenated polyethylene, polypropylene, ethylene-propylene copolymer, polyisobutylene, polybutene, and ethylene-vinyl acetate copolymer. Chlorinated polypropylene is presently preferred.

Chlorinated polyolefins suitable for use in the present invention preferably have a chlorine content ranging from about 5 to about 70 weight percent, more preferably about 10 to about 30 weight percent, and most preferably about 18 to about 25 weight percent based on the total solid weight of the final chlorinated polyolefin. The chlorinated polyolefins used in the present invention can be solid, in powder or pelletized form, or could be liquid. Suitable chlorinated polyolefins can have a weight average molecular weight ranging from about 10,000 to about 150,000, preferably from about 20,000 to about 125,000, and most preferably from about 25,000 to about 105,000, as determined by gel permeation chromatography using a polystyrene standard. Examples of suitable chlorinated polyolefins are disclosed in U.S. Pat. Nos. 4,997,882; 5,319,032; and 5,397,602, herein incorporated by reference.

The chlorinated polyolefin preferably includes one or more reactive functionalities to facilitate formation of the graft copolymer as described below. Suitable functionalities include anhydride (preferred), carboxylic acid, hydroxyl, epoxy, and isocyanate functionalities. Suitable chlorinated polyolefins for the practice of the invention include chlorinated maleated polypropylene polymers commercially available from Toyo Kasei Kogyo Co., Ltd. under the trademarks HARDLEN 13 MLJ and HARDLEN CY9122P.

In the practice of the invention, one or more hydrogenated or substantially saturated hydrocarbon polymers are grafted onto the halogenated polyolefin polymer, such as a chlorinated maleated polypropylene polymer as described above, to form a graft copolymer. Preferably, the hydrocarbon polymer contains about 85 to about 99 weight percent of hydrocarbon units and less than about 13 percent by weight of heteroatoms such as oxygen, nitrogen and sulfur. Preferably, the hydrocarbon polymer contains less than 6 percent by weight of heteroatoms, more preferably less than 3 percent, and most preferably less than 2 percent. Because of the minimal heteroatom content, the hydrocarbon polymer generally has a high molecular weight. Typically, the number average molecular weight of the hydrocarbon polymer ranges from about 1000 to 20,000 as determined by gel permeation chromatography using polystyrene as a standard.

In a preferred practice, the hydrocarbon polymer is at least "substantially saturated", i.e., the hydrocarbon polymer has been hydrogenated, usually after polymerization, such that at least about 90 percent and preferably at least about 95 percent of the carbon to carbon double bonds of the hydrocarbon polymer are saturated. Methods for hydrogenating unsaturated hydrocarbon polymers are well known to those skilled in the art. Examples of useful hydrogenation processes include hydrogenation in the presence of such catalysts as Raney Nickel, noble metals such as platinum and the like, soluble transition metal catalysts and titanium catalysts as in U.S. Pat. No. 5,039,755, which is hereby incorporated by reference.

The hydrocarbon polymer preferably contains an average of more than one reactive functionality, e.g., terminal or pendant functional group, per molecule. Preferably, the hydrocarbon polymer, which can be present as a mixture of different hydrocarbon polymers, contains an average of about 1.5 to about 6 terminal or pendent polar groups per molecule. At least one functional group (first group) of the hydrocarbon polymer is capable of reacting with the functionality of the halogenated polyolefin to form the graft copolymer of the invention. At least one other functional group (second group) of the hydrocarbon polymer is capable of reacting with a crosslinking agent, such as described below. The reactive first and second functional groups of the hydrocarbon polymer can be the same or different. Preferably, the hydrocarbon polymer contains at least two terminal polar groups per molecule.

The polar groups of the hydrocarbon polymer capable of reacting with the halogenated polyolefin preferably include carboxyl groups, hydroxyl groups, amino groups, amide groups, mercaptan groups, epoxy groups, isocyanate groups, and combinations thereof. Preferably, the polar groups are hydroxyl groups. The other functional group capable of reacting with the crosslinking agent can be one of these functional groups or can be a different group, such as carbamate. More preferably, the hydrocarbon polymer contains two terminal hydroxyl groups.

In a preferred embodiment, the hydrocarbon polymer comprises one or more substantially saturated polyhydroxylated polydiene polymers. Polyhydroxylated polydiene polymers made using isoprene or butadiene, as described in U.S. Pat. Nos. 5,486,570 and 5,376,745 (which are hereby incorporated by reference) and which are substantially saturated, are suitable for use in the present invention. Polyhydroxylated polydiene polymers of this type generally have a hydroxyl equivalent weight of between about 500 and about 20,000. Preferably, the saturated polyhydroxylated polydiene polymer is a dihydroxy polybutadiene which contains about two terminal hydroxyl groups, one at each end of the polymer, and has a hydroxyl equivalent weight of about 1,000 to about 5000.

Suitable substantially saturated polyhydroxylated polydiene polymers include those synthesized by free radical polymerization of dienes or anionic polymerization of conjugated diene hydrocarbons, such as butadiene or isoprene, with lithium initiators. The process steps for preparing polyhydroxylated polydiene polymers by anionic polymerization are described in U.S. Pat. Nos. 4,039,593; Re. 27,145; and 5,376,745, which are hereby incorporated by reference. Such polymers are typically made with a di-lithium initiator, such as a compound formed by reaction of two moles of sec-butyllithium with one mole of diisopropylbenzene. The polymerization of butadiene can be performed in a solvent composed of 90 percent by weight cyclohexane and 10 percent by weight diethylether. The molar ratio of di-initiator to monomer determines the molecular weight of the polymer. The polymer is capped with two moles of ethylene oxide and terminated with two moles of methanol to produce the dihydroxy polybutadiene. Suitable polyhydroxylated polydienes include KRATON LIQUID™ POLYMERS HPVM 2200 series products and Shell Diol L-2203, both produced by Shell Chemical Co.

Other suitable substantially saturated polyhydroxylated polydiene polymers preferably have at least about 90 weight percent repeat units derived from conjugated dienes. The monomers used to form the polymers include olefins having from 2 to 6 carbon atoms such as are disclosed in U.S. Pat. Nos. 4,518,753 and 3,652,732, which are hereby incorporated by reference. Optionally, the polyhydroxylated polydiene polymers can be formed from up to 50 mole percent of ethylenically unsaturated comonomers having from 2 to 10 carbon atoms and substituents including aromatics, halogens, cyanides, esters, and hydroxy esters. Examples of such polymers are hydroxyl terminated diene-based polymers including anionically polymerized dienes which are given hydroxyl groups in the chain termination step or free radically polymerized dienes such as those initiated with hydrogen peroxide. Such hydrogenated substantially saturated polyhydroxylated polydiene polymers are described in U.S. Pat. Nos. 5,115,007 and 5,221,707, which are hereby incorporated by reference. These polymers preferably have a Mn ranging from about 500 to about 20,000 and more preferably about 1,000 to about 8,000 grams per mole and have from 2 to 6 and more preferably from 2 to 4 hydroxyl end groups per molecule.

Useful hydroxyl terminated hydrogenated diene polymers include POLYTAIL polymers, such as POLYTAIL HA, POLYTAIL H and POLYTAIL H10, which are commercially available from Mitsubishi Chemical Corp. When some of these polymers are hydrogenated, they form crystalline solids such as the crystalline POLYTAIL H polymer which has a melting point of about 60° C. to about 70° C.

POLYTAIL HA polymer is a non-crystalline, linear, hydrogenated butadiene diol polymer liquid having about 10 percent 1,4-addition repeating units and about 90 percent 1,2-addition repeating units. POLYTAIL HA has about two terminal hydroxyl groups per molecule and is a viscous liquid at low molecular weights such as the peak molecular weight of 2000 as described in U.S. Pat. Nos. 4,866,120 and 4,020,125, which are hereby incorporated by reference. POLYTAIL H polymer has hydrogenated trans 1,4-, cis 1,4- and 1,2-addition repeat units and 2 or more hydroxyls per molecule.

The POLYTAIL H, HA and H10 polymers have the generalized structure:

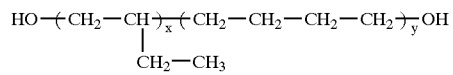

wherein X and Y are randomly distributed and the structure can contain additional —OH groups. The X/Y ratio, the —OH number per polymeric molecule, the physical state at 25° C., and the melting points of the POLYTAIL materials are as follows:

|  | Suitable Range | POLYTAIL H** | POLYTAIL HA*** | POLYTAIL H10 |
| --- | --- | --- | --- | --- |
| X/Y | 0.10 to 10.0 | 2/8 | 9/1 | 2/8 |
| Mn | 500 to 20,000 | 2800 | 2000 | 1400 |
| OH Functionality* | 1.5 to 4 | 2.1 to 2.3 | 1.8 to 1.9 | |
| Physical State | Liquid to low melting solid (MP </= 80° C.) | Waxy solid | Liquid | Soft waxy solid |

*Number of OH groups per average molecule (an average number of hydroxyl functional groups).
**POLYTAIL H has an OH value in the range of 37–53 mg/g KOH as determined by titration with KOH, a hydrogen saturation degree of at least 99% (iodine value: 3.9 g/100 g) and a number average molecular weight of about 2800.
***POLYTAIL HA has an OH value in the range of 41–55 mg/g KOH as determined by titration with KOH, has a hydrogen saturation degree of at least 99% (iodine value: 3.9 g/100 g) and a number average molecular weight of about 2000.

Another example of a suitable hydrogenated butadiene polymer is NISSO GI-2000 polymer produced by Nippon Soda which includes low molecular weight hydrogenated butadiene polymers which have terminal functional groups and 1,2-addition of about 84 percent.

Preferred hydrocarbon polymers for the practice of the invention are substantially hydrogenated polydienes which contain greater than 70 percent of 1,4-addition repeating units, and more preferably about 80 percent or more of 1,4-addition repeating units such as POLYTAIL H and POLYTAIL H10 described above. As discussed below, when substantially saturated polyhydroxylated polydiene polymers having hydroxy functionality and a predominant amount of hydrogenated trans 1,4-, and cis 1,4-repeat units as opposed to hydrogenated vinyl 1,2-repeat units are used, better adhesion to polymeric substrates may be obtained.

Preferably, the hydrocarbon polymer is essentially free of monohydroxylated hydrogenated diene polymers, i.e., the adhesion promoting agent preferably contains less than 25 weight percent of monohydroxylated diene polymers, more preferably less than about 10 weight percent, and most preferably the coating composition is free of monohydroxylated diene polymers.

The hydrocarbon polymer, e.g., hydrogenated hydroxy-terminated polybutadiene polymer, may be grafted onto the halogenated polyolefin, e.g., chlorinated maleated polypropylene polymer, in any conventional or well known method to form the graft copolymer of the invention. An exemplary grafting method is discussed below in which one of the reactive functionalities, e.g., a terminal hydroxyl group, on the hydrocarbon polymer, e.g., hydrogenated hydroxyl terminated polybutadiene, reacts with a reactive functionality, e.g., anhydride of the maleinized halogenated polyolefin, of the halogenated polyolefin, e.g., chlorinated polyolefin (CPO), to form the graft copolymer of the invention. A specific polymerization method is described in more detail in the example below. The grafted copolymer is useful as an adhesion promoting agent in accordance with the present invention. In the currently preferred embodiment, the weight percent of hydrogenated hydroxyl terminated polybutadiene to CPO in the graft copolymer preferably ranges from about 90%:10% to 10%:90%, more preferably about 90%:10% to about 25%:75%, and most preferably about 90%:10% to about 50%:50%, respectively, based on the total weight of the graft copolymer.

The above adhesion promoting agent of the invention can be incorporated into coating compositions of the present invention. Such coating compositions may be used as an adhesion promoter layer, a primer coating, a colored topcoat, a colored basecoat, or a clearcoat applied directly to a polymeric substrate. The term "directly onto a polymeric substrate" or similar terminology means that no flame or corona pretreatment, separate adhesion promoter layer or tie coat is required. The coating compositions of the invention can be solid (such as a powder), liquid or mixtures thereof. Preferably, the coating compositions are in the form of a liquid or dispersion.

A coating composition of the invention preferably comprises one or more adhesion promoting agents of the invention and one or more crosslinkable film-forming materials. The composition may also include one or more crosslinking materials if the film-forming material is not self-crosslinking.

In a preferred embodiment, the adhesion promoting agent is present in the coating composition in an amount ranging from about 1 to about 55 weight percent of the coating composition, preferably about 10 to about 45 weight percent, and more preferably about 20 to about 35 weight percent based on the total solid resin weight of the coating composition.

The adhesion promoting agent is used to promote adhesion of a crosslinkable film-forming system, e.g., adhesion promoting agent, film-forming resin, and crosslinking material, to the polymeric substrate. In a preferred embodiment, the film-forming system comprises about 40 to about 99.9 weight percent of the coating composition on a total solids basis, more preferably about 55 to about 95 weight percent, and most preferably about 60 to about 80 weight percent.

The crosslinkable film-forming system may comprise one or more crosslinkable film-forming resins and one or more crosslinking materials which are capable of reacting with the crosslinkable film-forming resin and/or one or more of the reactive functionalities of the graft copolymer, e.g., a reactive functionality on the hydrocarbon polymer portion of the graft copolymer. As used herein, "film-forming" means that the film-forming resin(s) forms a self-supporting continuous film on at least a horizontal surface of the substrate upon curing at ambient or elevated temperature and also includes oligomeric or polymeric materials that upon removal of any solvents or carriers present in the polymer emulsion, dispersion, suspension or solution, can coalesce to form a film on at least a horizontal surface of the substrate and are capable of curing into a continuous film.

Suitable crosslinkable film-forming resins include acrylic polymers and copolymers such as acrylic polyol polymers and polyacrylourethanes; polyester polymers and copolymers such as polyester urethanes and polyester polyol polymers; polyurethane polymers and copolymers such as polyether urethanes and the like. These polymers generally have active hydrogens either in their chemical structure and/or from functional groups that can be present on the polymers, such as one or more hydroxyl, carboxyl, amido, primary and/or secondary amino, epoxy, thiol, carbamate groups and the like. Examples of useful crosslinkable film-forming resins include oligomers and polymers such as hydroxy functional polyester oligomers or polymers, carbamate functional polyester oligomers or polymers, hydroxy functional acrylic oligomers or polymers, carbamate functional acrylic oligomers or polymers, hydroxy functional urethane oligomers or polymers, carbamate functional urethane oligomers or polymers, epoxy functional acrylic oligomers or polymers and mixtures thereof.

Suitable crosslinkable acrylic polymers include crosslinkable homopolymers and copolymers of acrylic acid, methacrylic acid and/or alkyl esters thereof having from 1 to 20 carbon atoms in the alkyl group which can be optionally copolymerized with one or more other polymerizable ethylenically unsaturated monomers. Suitable alkyl esters of acrylic acid or methacrylic acid include methyl methacrylate, isobutyl methacrylate, ethyl methacrylate, n-butyl methacrylate, ethyl acrylate, n-butyl acrylate, 2-ethylhexyl acrylate and 2-ethylhexyl methacrylate. Suitable copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. Suitable active hydrogen functional monomers can be used in addition to the other acrylic monomers mentioned above and include, for example, hydroxyethyl acrylate, hydroxyethyl methacrylate, hydroxypropyl acrylate, and hydroxypropyl methacrylate. Epoxy functional acrylics are also useful.

The acrylic polymer can be prepared by free radical initiated solution polymerization techniques in the presence of suitable free radical initiators such as organic peroxides or azo compounds, for example, benzoyl peroxide or 2,2'-azobis( 2-methylbutane nitrile) in an organic solvent in which the monomers and resultant polymer are soluble, such as xylene, toluene, or ketones such as methyl amyl ketone. Alternately, the acrylic polymer can be prepared by emulsion or dispersion polymerization techniques well known to those skilled in the art.

Suitable polyester polymers include alkyds and can be prepared by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylolpropane, and pentaerythritol. Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Functional equivalents of the polycarboxylic acids, such as anhydrides where they exist, or lower alkyl esters of the polycarboxylic acids, such as methyl esters, also can be used.

Where it is desired to produce air-drying alkyd resins from the polyester polymer, suitable drying oil fatty acids, such as those derived from linseed oil, soya bean oil, tall oil, dehydrated castor oil or tung oil, can be used to modify the polyester by methods well known to those skilled in the art. The polyester generally contains a portion of free hydroxyl and/or carboxyl groups which are available for crosslinking reaction with a crosslinking agent. Suitable crosslinking agents include amine or amide-aldehyde condensates or polyisocyanate curing agents as mentioned below.

Polyurethanes can also be used as the crosslinkable film-forming resin in the coating composition of the present invention. Suitable polyurethanes include polymeric polyols which are prepared by reacting polyester polyols or acrylic polyols such as those mentioned above with a polyisocyanate in an OH/NCO equivalent ratio of greater than 1:1 so that free hydroxyl groups are present in the product. Suitable organic polyisocyanates which can be used to prepare the polyurethane polyol include aliphatic or aromatic polyisocyanates or mixtures thereof. Diisocyanates are preferred, although higher polyisocyanates can be used in place of or in combination with diisocyanates.

The film-forming resin generally comprises about 10 to about 85 weight percent based upon total resin solids of the coating composition, and preferably about 20 to about 75 weight percent.

The crosslinkable film-forming system can comprise one or more crosslinking materials, such as aminoplasts, polyacids, anhydrides, polyisocyanates and mixtures thereof. The crosslinking material can be a separate component of the coating composition or can be incorporated into the film-forming resin, i.e. the film-forming resin can be self-crosslinking. The crosslinking material should be capable of reacting with at least one functionality on the graft copolymer of the invention such that when the coating composition is cured, the graft copolymer of the invention is incorporated into the crosslinked film structure of the cured coating. The amount of crosslinking material in the system generally ranges from about 15 to about 50 weight percent based upon total resin solids of the coating composition, and preferably ranges from about 25 to about 45 weight percent.

When amide or carbamate functional resins are present, aminoplast crosslinking materials are preferred. With hydroxy or epoxy functional resins, aminoplast, isocyanate functional or anhydride functional crosslinking agents are preferred. With acid functional resins, aminoplast or epoxy functional crosslinking materials are preferred. Additionally, acid or amine functional crosslinking materials can be used with epoxy functional resins. Isocyanate crosslinkers, including mono-, di-, and polyisocyanates can be used in conjunction with any of the active hydrogen containing or epoxy functional film-forming resins suitable for use in the coating composition.

Aminoplast crosslinking materials are suitable for use with most crosslinkable film-forming resins and are preferably present as the predominant crosslinking material in the coating composition. Suitable aminoplasts are made by reaction of materials bearing NH groups, such as urea, melamine, benzoguanamine, glycouril and cyclic ureas, with carbonyl compounds such as formaldehyde or higher aldehyde and ketones, and alcohols such as methanol ethanol, butanol propanol and hexanol. Condensation products obtained from the reaction of alcohols and formaldehyde with melamine, urea or benzoguanamine are most common and preferred herein. However, condensation products of other amines and amides can also be used, for example, aldehyde condensates of triazines, diazines, triazoles, guanadines, guanamines and alkyl- and aryl-substituted melamines.

The aminoplast crosslinking agent can be alkylated, for example, suitable aminoplast crosslinking agents include methylated and/or butylated or isobutylated melamine formaldehyde resins which are substantially monomeric or polymeric with a degree of polymerization ranging from about 1.2 to about 3.

The aminoplast resins can contain methylol or similar alkylol groups, and in most instances, at least a portion of these alkylol groups are etherified by reaction with an alcohol to provide organic solvent soluble resins. Any monohydric alcohol can be used to etherify the alkylol groups, including methanol, ethanol, propanol, butanol, pentanol, hexanol and heptanol, as well as benzyl alcohol and other aromatic alcohols, cyclic alcohols such as cyclohexanol, monoethers of glycols such as methoxypropanol and methoxyethoxyethanol, and halogen substituted or other substituted alcohols, such as 3-chloropropanol or butoxyethanol. Preferably, 3 to 6 methanol groups per molecule of melamine are reacted. Melamine formaldehyde resins with a mixture of etherification can also be used. Generally, these can range from mostly methylated groups with a minor amount of butylated groups to a substantial amount of butylated groups-with a minor amount of methylated groups. Such crosslinking agents typically have a number average molecular weight of about 300 to about 600. Suitable aminoplast resins are commercially available from Cytec Industries Inc. under the trademark CYMEL and from Solutia, Inc. under the trademark RESIMENE.

Polyacid crosslinking materials suitable for use in the present invention on average generally contain greater than one acid group per molecule, more preferably three or more and most preferably four or more, such acid groups being reactive with epoxy functional film-forming polymers. Preferred polyacid crosslinking materials have di-, tri- or higher functionalities. Suitable polyacid crosslinking materials which can be used include carboxylic acid group-containing oligomers, polymers and compounds, such as acrylic polymers, polyesters, and polyurethanes and compounds having phosphorus-based acid groups.

Examples of suitable polyacid crosslinking materials include ester group-containing oligomers and compounds including half-esters formed from reacting polyols and cyclic 1,2-acid anhydrides or acid functional polyesters derived from polyols and polyacids or anhydrides. These half-esters are of relatively low molecular weight and are quite reactive with epoxy functionality. Suitable ester group-containing oligomers are described in U.S. Pat. No. 4,764,430, column 4, line 26 to column 5, line 68, which is hereby incorporated by reference.

Other useful crosslinking materials include acid-functional acrylic crosslinkers made by copolymerizing methacrylic acid and/or acrylic acid monomers with other ethylenically unsaturated copolymerizable monomers as the polyacid crosslinking material. Alternatively, acid-functional acrylics can be prepared from hydroxy-functional acrylics reacted with cyclic anhydrides.

In an alternative embodiment in which the coating composition is essentially free of monohydroxylated diene polymers, one or more isocyanate-containing crosslinking materials can be used to crosslink the hydroxy functional film-forming resins. The equivalent ratio of isocyanate-functional groups of the isocyanate-containing crosslinking material to polar groups of components of the film-forming system, such as the film-forming resin and/or adhesion promoting agent, is greater than 0.8:1, preferably greater than 0.9:1, and more preferably greater than 1.1:1. Most preferably, the equivalent ratio is 1:1 to facilitate crosslinking.

Useful isocyanate-containing materials include aliphatic, cycloaliphatic or aromatic di- or polyisocyanates, or mixtures thereof. Higher polyisocyanates are preferred, such as triisocyanates which can be used alone or in combination with diisocyanates. Examples of suitable aliphatic diisocyanates include trimethylene, tetramethylene, tetramethylxylylene, pentamethylene, hexamethylene, 1,2-propylene, 1,2-butylene, 2,3-butylene, and 1,3-butylene diisocyanates. Also suitable are cycloalkylene diisocyanates; aromatic diisocyanates; aliphatic-aromatic diisocyanates; nuclear-substituted aromatic diisocyanates; triisocyanates; tetraisocyanates; polymerized polyisocyanates such as hexamethylene diisocyanate trimers, isophorone diisocyanate trimers, toluene diisocyanate dimers and trimers; and the like. Isothiocyanates corresponding to the above-described isocyanates, where they exist, can be employed as well as mixtures of materials containing both isocyanate and isothiocyanate groups. Suitable isocyanates are commercially available from Bayer USA, Inc. under the trademarks MONDUR and DESMODUR.

The coating composition of the present invention can further comprise one or more compatibilizers to assist in overcoming incompatibility between the adhesion promoting agent of the invention, particularly any remaining free hydrocarbon diol, and the other components of the coating composition. When presents the amount of compatibilizer, as a distinct component in the coating composition separate from the adhesion promoting agent, crosslinkable film-forming resin and crosslinking material, can range from about 0.01 to about 60 weight percent, preferably from about 3 to about 50 weight percent, more preferably from about 5 to about 30 weight percent, and most preferably from about 7 to about 25 weight percent based on total resin solids of the coating composition. Suitable compatibilizers, such as hydrocarbon alcohols or resinous materials, are disclosed in U.S. application Ser. No. 09/212,784, herein incorporated by reference.

The coating composition of the present invention can also contain one or more dyes or pigments to give it color. Compositions containing metallic flake pigmentation are especially useful for the production of so-called "glamour metallic" finishes, chiefly upon the surface of automobile bodies and parts. Proper orientation of the metallic pigment results in a lustrous shiny appearance with excellent flop, distinctness of image and high gloss. Suitable metallic pigments include aluminum flakes, bronze flakes, coated mica, nickel flakes, tin flakes, silver flakes, copper flakes, or combinations thereof.

The coating compositions of the present invention also can contain non-metallic color pigments conventionally used in coating compositions, including inorganic pigments, such as titanium dioxide, talc, mica, iron oxides, lead oxides, chromium oxides, lead chromate and carbon black, including conductive carbon black, and organic pigments such as phthalocyanine blue and phthalocyanine green, as well as a variety of other color pigments. In general, the total amount of pigment in the coating composition ranges from about 1 to about 60 percent by weight based on weight of the total solids of the composition. The metallic pigment is preferably used in amounts of 0.5 to 25 percent by weight of the aforesaid aggregate weight. The specific pigment to binder ratio can vary widely so long as it provides the requisite hiding at desired film thickness and application solids. The coating compositions can also include conductive pigments, such as conductive carbon black or carbon fibrils.

If desired, the coating composition of the present invention can contain other materials well known in the art of formulating surface coatings, such as surfactants, flow control agents, thixotropic agents, fillers, anti-gassing agents, organic co-solvents, additional film-forming polymers, polymeric microparticles, catalysts and other conventional additives. Nonexclusive examples of useful solvents included in the composition, in addition to any provided by other coating components, include aliphatic solvents; aromatic and/or alkylated aromatic solvents such as toluene, xylene, and SOLVESSO 100; alcohols such as isopropanol; esters; ketones glycol ethers; and glycol ether esters. These other materials can constitute up to 40 percent by weight of the total weight of the resin solids of the coating composition.

The coating composition of the present invention can be made using techniques well known to those skilled in the art. The percent by weight solids content of the coating composition preferably varies from about 5 to about 100 percent. Preferably, the percent by weight of solids is about 12 to about 70 percent. The coating composition can be present in the form of a liquid or powder. When the coating composition is present as a liquid, viscosity of the coating composition preferably ranges from about 10 to about 40 seconds, preferably from about 12 to about 25 seconds as measured using a #4 Ford Cup.

The coating composition of the present invention can be made as a solvent-borne, water-borne or powder composition using techniques well known to those skilled in the art for making such compositions. For example, for water-borne coating or aqueous-based compositions, the adhesion promoting agent can be dispersed in water by any technique known in the art. One technique described in European Patent Application No. 601,665 includes heating a solution of the adhesion promoting agent until its viscosity is less than 3000 centipoise, adding a mixture of water and surfactant under high speed agitation, cooling the dispersion and then optionally subjecting the dispersion to turbulent flow and/or cavitation in an apparatus such as a MICROFLUIDIZER available from Microfluidics Corporation, Newton, Mass.

As an alternative to microfluidization, the components can be added in a manner and order under agitation in a suitable container to obtain the proper oil-in-water inversion. Often, use of additional solvent(s) such as coalescing solvents are used to prepare water-borne coatings. Examples of useful coalescing solvents include: propylene carbonate, glycols including ethylene glycol, diethylerre glycol, propylene glycol, polypropylene glycol, and 2,2,4-trimethyl pentane-1,3-diol, glycol ether alcohols including ethylene glycol butyl ether, diethylene glycol butyl ether, ethylene glycol hexyl ether, propylene glycol methyl ether, propylene glycol propyl ether, and propylene glycol phenyl ether, lower alcohols including isopropanol, butanol, p-amyl alcohol, and tridecyl alcohol, and the like. Ethylene glycol hexyl ether is preferred. The coalescing solvent can be present in amounts ranging from about 5 to about 40 percent by weight, and preferably 15 to 30 percent by weight based on total solids weight of the aqueous dispersion. Suitable powder composition forming techniques are disclosed in U.S. Pat. No. 5,214,101, column 8, lines 9–18, which is hereby incorporated by reference.

The coating compositions of the present invention are useful as coating compositions for various thermoplastic and thermosetting polymeric substrates, for example, thermoplastic olefins including polyethylene and polypropylene substrates; reaction injected molding urethane (RIM) substrates; EPDM rubber substrates; and their blends. The coating composition can be applied to at least a portion of the surface of the substrate by conventional means including brushing, dipping, flow coating, spraying and the like but is most often applied by spraying. Conventionally known techniques and equipment for manual or automatic spraying and electrostatic spraying can be used. Although conventional application means are employed, the coating composition is deposited directly onto the surface of the polymeric substrate without the need of an adhesion promoter, tie coat layer or corona pretreatment.

During application of the coating composition to the polymeric substrate, a film of the coating composition is formed on the substrate. Typically, the film thickness ranges from about 0.01 to about 5.0 mils (about 0.254 to about 127 µm), preferably 0.08 to 3.0 mils (5.1 to 76.2 µm). When the coating composition is used as a primer, preferably the dry film thickness is about 0.08 to about 3.0 mils (about 5.1 to about 76.2 µm) and most preferably from 0.08 to 2.0 mils (5.1 to 50.8 µm). When used as a basecoat or topcoat including clear topcoat, preferably the dry film thickness is about 0.2 to about 3.0 mils (about 5.1 to about 76.2 µm).

After the application of the coating composition to the polymeric or other substrate, the coated substrate may be heated to cure the coating material or cure the coating layers of a basecoat-clearcoat system. In some instances, simply air drying the coating composition will be sufficient. In the curing process, organic solvents and/or water are driven out of the deposited film and the film-forming materials of the coating composition are crosslinked with the aid of the crosslinking resins present. The heating or curing operation is usually carried out at a temperature that is below the melting point of the plastic substrate to which the coating composition has been applied, generally of about 60° F. to about 350° F. (about 15° C. to about 177° C.), preferably of about 160° F. to about 350° F. (about 71° C. to about 177° C.), and most preferably from about 235° F. to about 275° F. (about 113° C. to about 132° C.). During curing, the selected crosslinking material reacts with the film-forming resin and at least one reactive functionality on graft copolymer, e.g., a functionality on the hydrocarbon polymer portion of the graft copolymer, such that the graft copolymer of the invention is incorporated into the crosslinked structure of the cured coating.

When the coating composition is used as a primer, subsequent topcoats such as conventional basecoat-clearcoat composites or conventional monocoat topcoats can be applied to the primer film. Optionally, when the coating composition is used as a basecoat, a subsequent conventional clearcoat can be applied to the dried or cured basecoat film. Usually when the coating composition of the present invention is used as a basecoat, the deposited basecoat film is flashed at ambient conditions for about 1 to about 5 minutes before the clearcoat is applied "wet on wet", then the basecoat-clearcoat composite is cured as detailed above. Still further, when used as a primer or an adhesion promoter layer, the coating composition can be air flashed for about 0.5 to about 30 minutes for subsequent application of topcoat layer(s) or, alternatively, can be pre-baked to a cured film prior to topcoat application.

The present invention will now be illustrated by the following specific, non-limiting Example. All parts and percentages are by weight unless otherwise indicated.

The following Examples show the preparation of various pigmented film-forming coating compositions of the invention incorporating adhesion promoting agents of the invention.

EXAMPLE 1

This Example illustrates the formation of coating compositions containing the graft copolymer of the invention and compositions without the graft copolymer for comparison testing.

Resin Formulations

Resin compositions as shown in Table 1 were prepared (all amounts in the following Tables are in grams unless otherwise indicated). Resins 1, 3, 5 and 9 were prepared in accordance with the present invention and contain a graft copolymer of the invention prepared as described below. Resins 2, 4, and 6–8 are non-grafted compositions or blends and were used as comparative examples as described below.

Resins 1 and 2 are of similar composition except resin 1 includes a grafted copolymer material while resin 2 is non-grafted. Resins 3 and 4 are similarly comprised, with resin 3 being grafted and resin 4 being non-grafted. Resin 5 is similar to resin 1 but utilizes POLYTAIL HA, having a lower molecular weight than POLYTAIL H used in resin 1. Resins 6, 7 and 8 contain various chlorinated polyolefins or hydrogenated hydroxy terminated polybutadiene diol. Resin 9 is a grafted reaction product of a chlorinated polyolefin and a hydroxy terminated polybutadiene diol but with a lower diol ratio than resin 1. The amounts of each component in Table 1 are on a basis of parts of component (including both solids and non-solids) which provide a total of 100 parts of solids of the specified components in each Sample. For example, Sample 1 has 125.0 parts of Hardlen 13 MLJ (which has 20% solids, i.e., 25 parts solids) and 75.0 parts of POLYTAIL H (100% solids) such that Sample A is formulated on a basis of 100 parts total solids.

TABLE 1

| Components | 1 | 2 | 3 | 4 | 5 | 6 | 7 | 8 | 9 |
|---|---|---|---|---|---|---|---|---|---|
| 13-MLJ[1] | 125.0 | 125.0 | 0.0 | 0.0 | 125.0 | 500.0 | 0.0 | 0.0 | 200.0 |
| CY9122P[2] | 0.0 | 0.0 | 24.9 | 25.0 | 0.0 | 0.0 | 0.0 | 99.0 | 0.0 |
| POLYTAIL H[3] | 75.0 | 75.0 | 74.8 | 75.0 | 0.0 | 0.0 | 100.0 | 0.0 | 60.0 |

TABLE 1-continued

| Components | 1 | 2 | 3 | 4 | 5 | 6 | 7 | 8 | 9 |
|---|---|---|---|---|---|---|---|---|---|
| POLYTAIL HA[4] | 0.0 | 0.0 | 0.0 | 0.0 | 75.0 | 0.0 | 0.0 | 0.0 | 0.0 |
| Toluene | 276.2 | 276.2 | 303.2 | 369.5 | 256.6 | 0.0 | 412.8 | 405.1 | 198.7 |
| t-butanol | 0.0 | 0.0 | 0.0 | 0.0 | 0.0 | 0.0 | 0.0 | 1.0 | 0.0 |
| EPON 880 epoxy resin[5] | 0.0 | 0.0 | 0.3 | 0.0 | 0.0 | 0.0 | 0.0 | 0.0 | 0.0 |
| Grafted | Y | N | Y | N | Y | N/A | N/A | N/A | Y |

[1]20 Wt. % solid chlorinated maleated polyolefin in toluene commercially available from Toyo Kasei Kogyo as HARDLEN 13 MLJ.
[2]100% solids chlorinated maleated polyolefin commercially available from Toyo Kasei Kogyo as HARDLEN CY9122P.
[3]POLYTAIL H 100% solids hydrogenated hydroxy terminated polybutadiene diol having about 80 percent 1,4-addition repeating units and about 20 percent 1,2-addition repeating units, commercially available from Mitsubishi Chemicals.
[4]POLYTAIL HA 100% solids hydrogenated hydroxy terminated polybutadiene diol having about 10 percent 1,4-addition repeating units and about 90 percent 1,2-addition repeating units, commercially available from Mitsubishi Chemicals.
[5]EPON 880 epoxy functional polyglycidyl ether of bisphenol A prepared from bisphenol-A and epichlorohydrin is commercially available from Shell Chemical Co.

Samples 1–9 were scaled up and prepared as follows:

Resin 1

A reaction vessel equipped with stirrer, thermocouple and condenser was charged with 200.0 g HARDLEN 13 MLJ chlorinated polyolefin (CPO), 120.0 g POLYTAIL H and heated to 120° C. The reaction was stirred for six hours and cooled to 55° C. After two hours the reaction was cooled to room temperature. Toluene (480.0 g) was added and the resulting mixture was heated to 55° C., stirred one hour and cooled again to room temperature. The resultant product, including a graft copolymer of the CPO and POLYTAIL H, had a solids content of 21.0 weight percent.

Resin 2

A reaction vessel equipped with stirrer, thermocouple and condenser was charged with 220.0 g HARDLEN 13 MLJ, 132.0 g POLYTAIL H and heated to 60° C. The material was stirred for 10 minutes and 528.0 grams of toluene was added. The mixture was cooled to less than 40° C. The resultant product, including a non-grafted mixture of CPO and POLYTAIL H, had a solids content of 21.0 weight percent measured for one hour at 110° C.

Resin 3

A reaction vessel equipped with stirrer, thermocouple and condenser was charged with 100.0 g HARDLEN CY9122P chlorinated polyolefin (CPO), 300.0 g POLYTAIL H, 1.0 g EPON 880 and 400.0 g toluene and heated to reflux (ca. 113° C.). The reaction was stirred for six hours and diluted with 799.0 g toluene. The resultant product, including a grafted copolymer of CPO and POLYTAIL H, had a solids content of 24.8 weight percent measured for one hour at 110° C.

Resin 4

A reaction vessel equipped with stirrer, thermocouple and condenser was charged with 44.0 g HARDLEN CY9122P, 132.0 g POLYTAIL H and 704.0 g toluene and heated to 60° C. The material was stirred until the HARDLEN CY9122P was dissolved (ca. 30 minutes) and cooled to less than 50° C. The resultant product, including a non-grafted mixture of CPO and POLYTAIL H, had a solids content of 19.6 weight percent measured for 1 hour at 110° C.

Resin 5

A reaction vessel equipped with stirrer, thermocouple and condenser was charged with 220.0 g HARDLEN 13 MLJ, 132.0 g POLYTAIL HA and heated to 120° C. The reaction was stirred for six hours, 528.0 g toluene was added and the mixture was then cooled. The resultant product, including a grafted copolymer of CPO and POLYTAIL HA, had a solids content of 21.9 weight percent measured for one hour at 110° C.

Resin 6

This composition is a 20 weight percent solids solution of HARDLEN 13 MLJ chlorinated polypropylene in toluene.

Resin 7

A reaction vessel equipped with stirrer, thermocouple and condenser was charged with 600.0 g POLYTAIL H and 2400.0 g toluene and heated to 50° C. After two hours the resulting solution was cooled.

Resin 8

A reaction vessel with a stirrer, thermocouple and condenser was charged with 760.0 g toluene, 190.0 g Hardlen CY 9122P and heated to 50° C. The vessel contents were stirred until the Hardlen CY 9122P was dissolved and then cooled to less than 30° C. Then 1.9 g of EPON 880 and 1.9 g of t-butanol were added. The resulting product had a solids content of 19.83 weight percent and a Brookfield viscosity of 130 centipoise measured with a #2 spindle at 60 rpm.

Resin 9

A reaction vessel equipped with a stirrer, thermocouple and condenser was charged with 315.0 g HARDLEN 13 MLJ and 94.5 g POLYTAIL H and heated to reflux (about 113° C.). The reaction was stirred for six hours and cooled to 55° C. After stirring for two hours, 378.0 g toluene was added and the reaction was cooled to room temperature. The resultant product, including a grafted copolymer of HARDLEN 13 MLJ and POLYTAIL H, had a solids content of about 21.8 weight percent measured for one hour at 110° C.

Grind Vehicle Preparation

Grind vehicles A–I as set forth in Table 2 were prepared from the resin formulations 1–9, respectively, listed in Table 1.

TABLE 2

| Components | A | B | C | D | E | F | G | H | I |
|---|---|---|---|---|---|---|---|---|---|
| Resin 1 | 253.8 | 0.0 | 0.0 | 0.0 | 0.0 | 0.0 | 0.0 | 0.0 | 0.0 |
| Resin 2 | 0.0 | 253.8 | 0.0 | 0.0 | 0.0 | 0.0 | 0.0 | 0.0 | 0.0 |
| Resin 3 | 0.0 | 0.0 | 214.9 | 0.0 | 0.0 | 0.0 | 0.0 | 0.0 | 0.0 |
| Resin 4 | 0.0 | 0.0 | 0.0 | 250.4 | 0.0 | 0.0 | 0.0 | 0.0 | 0.0 |
| Resin 5 | 0.0 | 0.0 | 0.0 | 0.0 | 243.4 | 0.0 | 0.0 | 0.0 | 0.0 |
| Resin 6 | 0.0 | 0.0 | 0.0 | 0.0 | 0.0 | 66.7 | 0.0 | 0.0 | 0.0 |
| Resin 7 | 0.0 | 0.0 | 0.0 | 0.0 | 0.0 | 0.0 | 205.1 | 0.0 | 0.0 |
| Resin 8 | 0.0 | 0.0 | 0.0 | 0.0 | 0.0 | 0.0 | 0.0 | 67.3 | 0.0 |
| Resin 9 | 0.0 | 0.0 | 0.0 | 0.0 | 0.0 | 0.0 | 0.0 | 0.0 | 306.0 |
| Alkyd Acrylic[1] | 84.9 | 84.9 | 84.9 | 84.9 | 84.9 | 157.6 | 109.1 | 157.6 | 60.5 |
| Black Pigment[2] | 38.0 | 38.0 | 38.0 | 38.0 | 38.0 | 38.0 | 38.0 | 38.0 | 38.0 |
| White Pigment[3] | 82.0 | 82.0 | 82.0 | 82.0 | 82.0 | 82.0 | 82.0 | 82.0 | 82.0 |
| SOLVESSO 100[4] | 641.3 | 641.3 | 680.2 | 644.7 | 651.7 | 755.7 | 665.8 | 755.1 | 613.5 |

[1]An alkyd acrylic resin composition prepared from the components of Table 3 and prepared as described below (OH value about 15; acid value about 3.5). The amounts of each component in Table 3 are on a basis of parts of component (including both solids and non-solids) to provide a total of 100 parts of solids of the specified components.

TABLE 3

(Alkyd Acrylic)

| Component | Amount |
|---|---|
| Linoleic Acid | 26.35 |
| Pentaerythritol (technical grade) | 11.77 |
| phthalic anhydride | 9.88 |
| crotonic acid | 7.00 |
| dibutyl tin dioxide | 0.10 |
| styrene | 24.30 |
| t-butyl perbenzoate | 0.8 |
| methyl methacrylate | 12.11 |
| acrylonitrile | 4.53 |
| 2-ethylhexyl acrylate | 4.00 |
| xylene | 81.80 |

[2]Carbon black commercially available from Cabot Chemicals as Vulcan SC-72R carbon black.
[3]Titanium dioxide commercially available from E. I. DuPont de Nemours & Co. as R-902-38 titanium dioxide white.
[4]A mixture of mixed xylenes, aromatic naphtha and trimethyl benzene commercially available from Exxon Chemicals.

The alkyd acrylic composition of Table 3 used in forming the grind vehicles A–I of Table 2 was prepared in a two step process as follows.

Step 1 (alkyd preparation): A reaction vessel equipped with stirrer, thermocouple, glycol recovery column and condenser was charged with 1366.0 g EMERSOL 315 linoleic fatty acid (commercially available from Cognis Emery Group), 610.0 g pentaerythritol, 363.0 g crotonic acid, 512.0 g phthalic anhydride and 5.07 g dibutyl tin oxide. The reactor contents were heated to 215° C. and water removed until the acid value was 28 to 30 mg KOH/g. Then, the glycol recovery column was replaced with a Dean-Stark trap filled with xylene and 43.5 g of xylene added to the reaction vessel. Water was azeotropically removed until the acid value was less than 10 mg KOH/g. The resulting alkyd was diluted with 895.0 g xylene to afford a solution with solids weight percent of 70% measured for one hour at 110° C., an acid value of 4 to 9 mg KOH/g, and a Gardner viscosity of E to G.

Step 2 (alkyd acrylic preparation): A reaction vessel equipped with stirrer, addition funnel, thermocouple, and condenser was charged with 980.0 g xylene, 2239.0 g the alkyd solution from step 1, 370.0 g methyl methacrylate, 122.0 g 2-ethyl hexyl acrylate, 740.0 g styrene, 138.0 g acrylonitrile, 15.6 g t-butyl perbenzoate and 13.6 g xylene. The reactor contents were heated to 124° C. over 4.5 hours. External reactor cooling was applied when the reactor contents temperature reached 110° C. to control the resulting exotherm to less than 130° C. The reactor contents were stirred for one hour at 124° C.–127° C. Then, a solution of 4.0 g t-butyl perbenzoate and 13.6 g xylene were added over 90 minutes. After stirring for 30 minutes, another solution of 4.0 g t-butyl perbenzoate and 13.6 g xylene was added over 90 minutes, the addition funnel rinsed with 2.0 g xylene and the reactor contents stirred for another 2 hours. Then, the reactor contents were cooled to 115° C., and 14 inches of vacuum was applied to distill 980.0 g solvent. Xylene (171.9 g) was added to the reactor to afford a product with 55 weight percent solids content (measured for one hour at 110° C.), an acid value of 2 to 5 mg KOH/g, a Gardner viscosity of U to W, and free acrylonitrile content of less than 50 ppm.

The grind vehicles A–I were each prepared in similar manner and the preparation of grind vehicle A will be described as an example of such preparation. With reference to Table 2, the black pigment and white pigment were added into a steel container. Resin 1 was added to the pigments and then the alkyd acrylic resin was added to the container. The mixture was slowly agitated with a Cowles blade and Zircoa beads were added to the blend until complete wetting of the pigments was visually determined (about 10 to 15 minutes) and the pigment dispersion had the consistency of thick molasses. After this, the stirrer was turned to high and about half of the listed amount of SOLVESSO 100 solvent was added. The dispersion was milled for about 45 to about 60 minutes, after which the pigment dispersion was further diluted with the remaining SOLVESSO 100 solvent to about 20 weight percent solids and collected.

Coating Compositions

The grind vehicles A–I from Table 2 were then used to prepare coating compositions 1–9, respectively as set forth in Table 4 and described below.

TABLE 4

| Component | Coating Composition No. | | | | | | | | |
|---|---|---|---|---|---|---|---|---|---|
| | 1 | 2 | 3 | 4 | 5 | 6 | 7 | 8 | 9 |
| Grind A | 495.0 | 0.0 | 0.0 | 0.0 | 0.0 | 0.0 | 0.0 | 0.0 | 0.0 |
| Grind B | 0.0 | 495.0 | 0.0 | 0.0 | 0.0 | 0.0 | 0.0 | 0.0 | 0.0 |
| Grind C | 0.0 | 0.0 | 495.0 | 0.0 | 0.0 | 0.0 | 0.0 | 0.0 | 0.0 |
| Grind D | 0.0 | 0.0 | 0.0 | 495.0 | 0.0 | 0.0 | 0.0 | 0.0 | 0.0 |
| Grind E | 0.0 | 0.0 | 0.0 | 0.0 | 495.0 | 0.0 | 0.0 | 0.0 | 0.0 |
| Grind F | 0.0 | 0.0 | 0.0 | 0.0 | 0.0 | 495.0 | 0.0 | 0.0 | 0.0 |
| Grind G | 0.0 | 0.0 | 0.0 | 0.0 | 0.0 | 0.0 | 495.0 | 0.0 | 0.0 |
| Grind H | 0.0 | 0.0 | 0.0 | 0.0 | 0.0 | 0.0 | 0.00 | 495.0 | 0.0 |
| Grind I | 0.0 | 0.0 | 0.0 | 0.0 | 0.0 | 0.0 | 0.0 | 0.0 | 495.0 |
| Alkyd Acrylic | 45.5 | 45.5 | 45.5 | 45.5 | 45.5 | 45.5 | 45.5 | 45.5 | 45.5 |
| SOLVESSO 100 | 17.6 | 17.6 | 17.6 | 17.6 | 17.6 | 17.6 | 17.6 | 17.6 | 17.6 |
| Ethanol | 30.0 | 30.0 | 30.0 | 30.0 | 30.0 | 30.0 | 30.0 | 30.0 | 30.0 |
| RESIMENE 717[1] | 35.7 | 35.7 | 35.7 | 35.7 | 35.7 | 35.7 | 35.7 | 35.7 | 35.7 |
| Catalyst[2] | 4.2 | 4.2 | 4.2 | 4.2 | 4.2 | 4.2 | 4.2 | 4.2 | 4.2 |
| Weight % Solids | 21.0 | 21.0 | 24.8 | 21.3 | 21.9 | 20.0 | 19.5 | 19.8 | 21.8 |
| Initial viscosity (#4 Ford cup; seconds at 72° F.) | 11.7 | 12.7 | 13.2 | 11.8 | 12.4 | 12.9 | 11.1 | 13.9 | 12.6 |

[1]RESIMENE 717 partially methylated high imino melamine at 84 weight percent solids commercially available from Solutia, Inc.
[2]Solution of dodecylbenzene sulfonic acid at 70 weight % solids in isobutanol.

The components were added in the order shown in Table 4 under agitation to form the coating compositions 1–9.

Initial Adhesion

Each of the pigmented coating compositions of Table 4 was hand spray applied onto SEQUEL 1440, ETA-3183, and D161B thermoplastic polyolefin (TPO) panels commercially available from Standard Plaque, Inc. Each panel was wiped with isopropanol and air dried before application of the coating composition. Each coating composition was hand sprayed directly to the surface of the TPO panel without the aid of any separate adhesion promoting layer or oxidizing pretreatment such as flame treatment. Each coating composition was applied to a dry film build of about 0.30 mil and then air dried.

CBC8555T black basecoat, commercially available from PPG Industries, Inc. of Pittsburgh, Pa., was then spray applied onto the panels using a Spraymation application machine. Two coats of the basecoat were applied with a 60 second ambient flash between coats. The cured film thickness of the basecoat was about 0.9 mil.

After an additional 90 second ambient flash of the basecoat, UCC1001T clearcoat, commercially available from PPG Industries, Inc., was spray applied over the basecoat. Two coats of the clearcoat were applied with a 60 second ambient flash between each coat, after which the coated panels were flashed at ambient conditions and then cured by baking for 40 minutes at 250° F. The cured film thickness of the clearcoat was about 1.6 mils. Initial adhesion of the coating systems 1–9 incorporating the coating compositions 1–9 on selected polymeric substrates was evaluated as described below and the results shown in Table 5.

TABLE 5

| System # | Coating Composition (Table 4) | Adhesion SEQ-1440 | Adhesion ETA-3783 | Adhesion D161B |
|---|---|---|---|---|
| 1 | 1 | 100 | 100 | 100 |
| 2 | 2 | 100 | 100 | 100 |
| 3 | 3 | 100 | 100 | 100 |
| 4 | 4 | 100 | 100 | 100 |
| 5 | 5 | 100 | 100 | 100 |
| 6 | 6 | 100 | 100 | 100 |
| 7 | 7 | 100 | 100 | 100 |
| 8 | 8 | 100 | 100 | 100 |
| 9 | 9 | 100 | 100 | 100 |

To evaluate initial adhesion, testing was conducted on an area within about 12.7 mm (0.5 inches) of the injection gate area of the molded panel. The injection area typically represents the most severe test area for adhesion. The initial adhesion testing was performed by scoring each test panel with a cross-hatch using a razor blade by making a first set of six parallel cuts (each spaced about 2 mm from an adjacent cut) in one direction and a set of six parallel cuts (each spaced about 1 mm from an adjacent cut) perpendicular to and intersecting each of the cuts of the first set.

Adhesion of the coating to the panel was determined using LP-24 Nichiban Tape (commercially available from Niche-Ban, Japan) according to ASTM D3359. The tape was applied to the cross-hatched area using moderate thumb pressure. The tape was lifted from the surface of the cross-hatched area by holding one end of the tape in place using an index finger and quickly lifting and pulling the other end of the tape from the surface. A total of 4 tape pulls in four different directions parallel to the razor cuts were conducted on the cross-hatched areas of the coated test panels. The results of the initial adhsion tests are shown in Table 5 on a percent basis, e.g., a 100% rating represents no adhesion failure after 4 tape pulls. A 90% rating represents 90% of the coating remaining in the cross-hatched area after 4 tape pulls, etc.

As shown in Table 5, all of the coating systems 1–9 had similar initial adhesion at the conditions tested.

Additional panels were prepared similarly to above using coating compositions 1, 3 and 7 (from Table 4) applied onto SEQUEL 1440, DEXFLEX-727, and DEXFLEX-777 TPO panels, commercially available from Standard Plaque, Inc., but cured at a lower temperature 235° F. for 40 minutes. These systems are designated 1A, 3A, and 7A in Table 6. A control panel was prepared in similar manner but using MPP4100 chlorinated polyolefin based adhesion promoter, commercially available from PPG Industries, Inc., rather than the coating compositions of Table 4. The results of initial adhesion of these coated panels are shown in Table 6.

panels, farthest away from the gate. The results of the humidity and subsequent adhesion testing are shown at Tables 7 and 8 below. In Tables 7 and 8, the first result recorded is the adhesion percentage. The first number after the slash is the blister size rating and the letters following the blister rating indicate the concentration of blisters, e.g., F=few, VF=very few, M= medium concentration, D=dense, and VD=very dense. Therefore, a recording of 100/9F–M means that the particular system had 100% adhesion with a blister rating of 9 and the blisters being few to medium in number.

TABLE 7

| System # (Table 5) | 4 Day SEQ-1440 | 4 Day ETA-3183 | 4 Day D161B | 10 Day SEQ-1440 | 10 Day ETA-3183 | 10 Day D161B |
|---|---|---|---|---|---|---|
| 1 | 100/9;F-M | 100/9;F-M | 100/9;F | 100;F-M | 100/9;M | 100;F-M |
| 2 | 100/8;F | 100/9;F | 100/9;M-F | 100/7;F | 100/9;F | 100/9;F-M |
| 3 | 100/9;VF | 100/9;VF | 100/9;F | 100/9;F | 100/9;F | 100/9;F |
| 4 | 100/9;M | 100/9;F | 100/8;M | 100/9;F-M | 100/9;F | 100/9;F-M |
| 5 | 100/9;VF | 100/9;VF | 100/9;VF | 100/9;VF | 100/9;F | 100/9;F |
| 6 | 100/9;D | 100/9;D | 100/8;D | 100/8;VD | 100/9;VF | 100/8;VF |
| 7 | 100/8;M | 100/8;M | 100/8;M | 100/8;M | 100/9;M | 100/8;M |
| 8 | 100/9;F | 100/9;VF | 100/9;VF | 100/9;F-M | 100/9;VF | 100/9;VF |
| 9 | 100/9;M | 100/9;M | 100/9;M | 100/9;F-M | 100/9;F-M | 100/9;M |

TABLE 8

| System # (Table 6) | 4 Day SEQ-1440 | 4 Day DEX-727 | 4 Day DEX-777 | 10 Day SEQ-1440 | 10 Day DEX-727 | 10 Day DEX-777 |
|---|---|---|---|---|---|---|
| 1A | 100/9;F | 100/9;F | 100/9;F | 100/9;M | 100/9;M | 100/9;M |
| 3A | 100/9;F | 100/9;F | 100/9;F | 100/9;F | 100/9;F | 100/9;F |
| 7A | 0/9;F | 0/9;F-M | 100/9;F-M | 0/9;F | 0/9;F-M | 100/9;F-M |
| Control | 100/9;F | 100/9;F | 100/9;F | 100/9;F | 100/9;F | 100/9;F |

TABLE 6

| System # | Coating Composition (Table 4) | Adhesion SEQ-1440 | Adhesion DEX-727 | Adhesion DEX-777 |
|---|---|---|---|---|
| 1A | 1 | 100 | 99 | 80 |
| 3A | 3 | 100 | 95 | 80 |
| 7A | 7 | 0 | 0 | 75 |
| Control | MPP4100D | 100 | 100 | 80 |

As shown in Table 6, the coating systems 1A and 3A incorporating the graft copolymer of the invention had better adhesion than the coating system 7A (polyolefin diol without CPO) and roughly equivalent adhesion when compared to the control coating.

Water Soak Tests

Four-day water soak tests were also conducted on similarly coated substrates as described above in accordance with ASTM D4585. The coated panels were exposed to 100% relative humidity and 38° C. (100° F.) for four days. The panels were evaluated for blistering using a relative scale of 1 to 9, with 1 indicating large blisters and 9 indicating small blisters. The blister concentration was also evaluated ranging from few (meaning very little concentration of blisters on the substrate) to dense (indicating a large number of blisters on the substrate). The coating adhesion after humidity testing also was evaluated in accordance with ASTM D3359 as described above. The adhesion after humidity testing was conducted in random areas of the The compositions with the grafted adhesion promoting agent of the invention provided generally equivalent or better humidity resistance than the non-grafted compositions and the CPO only and olefinic diol only compositions under the higher bake conditions (250° F.) of Table 7. However, as shown in Table 8, the coating systems 1A and 3A including the grafted adhesion promoting agent of the invention provided significantly better humidity resistance than the POLYTAIL H only (no CPO) containing system (7A).

Fuel Soak Tests

Coated and cured test panels as described above were also tested for gasohol and fuel soak resistance by submerging 4 inch×1 inch coated panels with a 1 inch×1 inch×-scribe into a simulated gasohol solution (a 95/95/10 parts by volume of toluene/naphtha/ethanol) or a simulated fuel mixture (1:1 volume mixture of toluene and naphtha) and observing the delamination over a 60 minute period or until the panel failed the test. By "failed the test" means the time required for approximately 35% delamination of the respective coating from the substrate. The results of these tests are shown in Tables 9 and 10 below. The values listed in the Tables are the minutes of soak time until the panel failed the test. For example, a result of 60+ means that the panel was in the respective solution for over 60 minutes and no failure was determined. Conversely, a reading of 30 means that after about 30 minutes, approximately 35% delamination of the coating from the substrate occurred.

TABLE 9

| System # (Table 5) | Gasohol SEQ-1440 | Gasohol ETA-3183 | Gasohol D161B | Fuel SEQ-1440 | Fuel ETA-3183 | Fuel D161B |
|---|---|---|---|---|---|---|
| 1 | 60+ | 60+ | 16 | 60+ | 60+ | 30 |
| 2 | 30 | 30 | 16 | 50 | 30 | 20 |
| 3 | 60+ | 60+ | 55 | 60+ | 60+ | 60+ |
| 4 | 15 | 15 | 16 | 30 | 30 | 30 |
| 5 | 15 | 15 | 16 | 20 | 30 | 30 |
| 6 | 15 | 15 | 16 | 30 | 30 | 20 |
| 7 | 60+ | 60+ | 60+ | 60+ | 60+ | 60+ |
| 8 | 15 | 15 | 16 | 20 | 20 | 20 |
| 9 | 60+ | 35 | 30 | 60+ | 50 | 30 |

TABLE 10

| System # (Table 6) | Gasohol SEQ-1440 | Gasohol DEX-727 | Gasohol DEX-777 | Fuel SEQ-1440 | Fuel DEX-727 | Fuel DEX-777 |
|---|---|---|---|---|---|---|
| 1A | 7 | 7 | 10 | 15 | 15 | 15 |
| 3A | 30 | 10 | 30 | 60+ | 20 | 60+ |
| 7A | 60+ | 60+ | 60+ | 60+ | 60+ | 60+ |
| Control | 7 | 7 | 10 | 15 | 15 | 15 |

As shown in Table 9, the coating compositions (systems 1, 3, and 9) incorporating the graft copolymer of the invention showed roughly equivalent fuel soak and gasohol resistance to that of the coating composition containing only the olefinic diol (system 7) when the systems were cured at 250° F. The grafted systems 1 and 3 had significantly better fuel and gasohol resistance over the majority of the substrates tested compared to the non-grafted systems 2 and 4 of similar composition. Additionally, the grafted systems 1, 3 and 9 had significantly better fuel and gasohol resistance than the CPO only containing compositions (systems 6 and 8) over the majority of the substrates. Also shown is the improved fuel and gasohol resistance of the grafted system 1 containing the higher amount of 1,4-addition repeat units compared to the grafted system 5 containing the higher amount of 1,2-addition repeat units over the majority of the substrates tested. As shown in Table 10, under lower bake conditions (235° F.) the grafted copolymer system 3A provided similar fuel resistance over SEQUEL-1440 and DEX-FLEX-777 substrates to that of the coating composition containing only the olefinic diol (system 7) and significantly better fuel and gasohol resistance compared to the commercial non-grafted CPO containing control.

In summary, systems containing only CPO showed generally good adhesion to polymeric substrates but fuel resistance could be improved. Systems containing only olefinic diols generally had good fuel resistance but lower adhesion to polymeric substrates, particularly at lower bake temperatures. Systems containing non-grafted blends of CPO and olefinic diol had good adhesion to polymeric substrates but non-optimum fuel soak resistance. In comparison, coating compositions containing the graft copolymer of the invention appear to show good adhesion to polymeric substrates as well as good fuel soak resistance.

EXAMPLE 2

A reaction vessel equipped with stirrer, thermocouple and condenser was charged with 1250.0 g of HARDLEN 13 MLJ chlorinated maleated polyolefin (CPO) in toluene, 875.0 g POLYTAIL H hydrogenated hydroxy terminated polybutadiene diol and 11.3 g EPONEX 1510 (the hydrogenated adduct of EPON 880, commercially available from Shell Chemical Company) and heated to reflux (about 114° C.) to form a graft copolymer of the HARDLEN 13 MLJ CPO and the POLYTAIL H polybutadiene diol.

After stirring for 6 hours 1000.0 g SOLVESSO 100 solvent and 614.5 g heptane were added. The reaction contents were cooled to 70° C. and then added over one hour to a solution of 2065.9 g acrylic alkyd of Table 3 (Example 1 above) and 1500.0 g SOLVESSO 100 solvent and stirred at room temperature. The reaction flask was rinsed with 542.4 g of SOLVESSO 100 solvent and this rinse was added to the Polytail H/Hardlen 13 MLJ graft copolymer and acrylic alkyd. This mixture was stirred for 45 minutes. The flask contents had a Hegman rating was 5+. The contents were warmed to 50° C., stirred for one hour and cooled to below 30° C. The resultant product had a solids content of 30.3 weight percent measured for one hour at 110° C., a Brookfield viscosity of 3690 centipoise measured with a #4 spindle at 60 rpm and a Hegman rating of 8+.

The pigment dispersion (grind vehicle) was prepared in a manner similar to that disclosed above in Example 1. The graft copolymer product prepared immediately above (330.0 grams) were placed in a steel container and agitated with a Cowles blade as pigments were slowly added. The first pigment added was 18.3 grams of Printex XE-2 Carbon Black commercially available from Cary Company followed by 62.4 grams of R-902-38 white titanium dioxide commercially available from E.I. DuPont de Nemours & Co.

The mixture was agitated moderately with a Cowles blade and Zircoa beads (about 40% on total paste volume) were added to the mixture until complete wetting of the pigments was observed (about 10 to about 15 minutes) and the pigment dispersion had the consistency of thick molasses. Then, the agitation speed was increased to high and 100 grams of SOLVESSO 150 solvent was added. The pigment dispersion was milled for about 45 to about 60 minutes, after which the pigment dispersion was further diluted with 30.8 grams of SOLVESSO 150 solvent to about 33.4 weight percent solids.

The grind vehicle (293.7 grams) was transferred into another container and stirred at a moderate rate. The following materials were added sequentially to the grind vehicle: 8.0 grams of a 25% solution of KRATON G-1726X (a linear thermoplastic rubber block copolymer of styrene-ethylene-butylene-styrene commercially available from Shell Chemical Company) in xylene, 5.0 grams of RESIMENE 717 partially methylated high imino melamine, 24.5 grams of the Alkyd Acrylic of Example 1 above, and 40.0 gms of isopropanol. The mixture was mixed for about 10 to about 15 minutes. Resimene 717 (29.8 grams) was added slowly. Then, 4.2 grams of a solution of dodecylbenzene sulfonic acid at 70 weight % solids in isobutanol was added. An additional 33.3 grams of isopropanol was added. Then, 106.7 grams of ISOPAR K mineral spirits (commercially available from Exxon Chemical) was added.

Each of the pigmented coating compositions of Table 4 was hand spray applied onto SEQUEL 1440 thermoplastic polyolefin (TPO) panels commercially available from Standard Plaque, Inc., CA287 TPO panels commercially available from Custom Precision R&D Testing Panels Inc., and AMTUFF 3110 TPO panels commercially available from Custom Precision R&D Testing Panels Inc. Each panel was wiped with isopropanol and air dried before application of the coating composition. Each coating composition was hand sprayed directly to the surface of the TPO panel without the aid of any separate adhesion promoting layer or oxidizing pretreatment such as flame treatment. Each coating composition was applied to a dry film build of about 0.30 mil and then air dried.

Then, CBCF6640J or CBCF6640K white basecoats, both commercially available from PPG Industries, Inc., were spray applied onto panels using a Spraymation application machine. Two coats of each respective basecoat were applied with a 60 second ambient flash between basecoat applications. The cured film thickness of the basecoat was about 1.6 mils.

After an additional 90 second ambient flash of the basecoat, UCC1001T or TKU2000C clearcoat, both commercially available from PPG Industries, Inc., were spray applied over the CBCF6640J or CBCF6640K basecoats, respectively. Two coats of the clearcoat were applied with a 60 second ambient flash between each coat, after which the coated panels were flashed at ambient conditions for about 10 minutes and then cured by baking for 40 minutes at 250° F. The cured film thickness of the clearcoat was about 1.8 mils.

A control panel was prepared in a similar manner but instead used MPP4100D chlorinated polyolefin-based adhesion promoter (commercially available from PPG Industries, Inc.) instead of the adhesion promoter coating composition including the graft copolymer of CPO and polyolefinic diol prepared above (System 10).

Each panel was evaluated for initial adhesion according to ASTM D3359 and gasohol or simulated fuel soak resistance in a manner similar to that described above in Example 1. Test panels also were evaluated for 4 and 10-day humidity adhesion resistance according to ASTM D4585 and D3359 as described in Example 1 above. The test results are reported in Table 11 below.

TABLE 11

| System | 4 Day CA-287 | 4 Day SEQ-1440 | 4 Day AMTUFF 3110 | 10 day CA-287 | 10 Day SEQ-1440 | 10 Day AMTUFF 3110 |
|---|---|---|---|---|---|---|
| Control (1k) | 100% | 100% | 100% | 100% | 100% | 100% |
| Control (2k) | 100% | 100% | 100% | 100% | 100% | 100% |
| System 10 (1k) | 100% | 100% | 100% | 100% | 100% | 100% |
| System 10 (2k) | 100% | 100% | 100% | 100% | 100% | 100% |

| | Fuel Soak CA-287 | Fuel Soak SEQ-1440 | Fuel Soak AMTUFF-3110 | Gasohol Immersion CA-287 | Gasohol Immersion SEQ-1440 | Gasohol Immersion AMTUFF-3110 |
|---|---|---|---|---|---|---|
| System Control (1k) | Failed at 35 min | Failed at 18 min | Failed at 20 min | Failed at 10 min | Failed at 8 min | Failed at 6 min |
| Control (2k) | 50 min | 45 min | 30 min | 20 min | 12 min | 12 min |
| System 10 (1k) | 25 min | 18 min | 20 min | 25 min | 16 min | 10 min |
| System 10 (2k) | 60 min+ | 45 min | 60 min+ | 60 min+ | 13 min | 10 min |

As shown in Table 11, the adhesion promoting coating composition of System 10 having the graft copolymer according to the present invention provided comparable adhesion and fuel soak resistance to the Control adhesion promoter system for the tested substrates.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. An adhesion promoting agent suitable for addition to a liquid or powder coating composition for forming a coating, comprising:
    a graft reactive copolymer having reactive functionality comprising the reaction product of:
        (i) a halogenated polyolefin polymer having at least one reactive functionality; reacted with (ii) a substantially saturated hydrocarbon polymer having more than one reactive functionality, at least one reactive functionality of the hydrocarbon polymer (ii) reacted with the reactive functionality of the halogenated polyolefin (i) such that the hydrocarbon polymer is grafted onto the polyolefin polymer to form the graft copolymer.

2. The adhesion promoting agent according to claim 1, wherein the halogenated polyolefin polymer (i) comprises a halogenated polypropylene polymer.

3. The adhesion promoting agent according to claim 1, wherein the halogenated polyolefin polymer (i) comprises a chlorinated polyolefin polymer.

4. The adhesion promoting agent according to claim 1, wherein the halogenated polyolefin polymer (i) comprises a chlorinated polypropylene polymer.

5. The adhesion promoting agent according to claim 1, wherein the at least one reactive functionality of the halogenated polyolefin polymer (i) is selected from the group consisting of anhydride, carboxylic acid, hydroxyl, epoxy, and isocyanate.

6. The adhesion promoting agent according to claim 1, wherein the halogenated polyolefin polymer (i) comprises a chlorinated polypropylene polymer having at least one reactive functionality selected from the group consisting of anhydride, carboxylic acid, hydroxyl, epoxy, and isocyanate.

7. The adhesion promoting agent according to claim 5, wherein the reactive functionality of the halogenated polyolefin polymer (i) comprises anhydride functionality.

8. The adhesion promoting agent according to claim 1, wherein the hydrocarbon polymer (ii) comprises a substantially saturated polydiene polymer.

9. The adhesion promoting agent according to claim 1, wherein the hydrocarbon polymer (ii) comprises a substantially saturated, hydroxy terminated, polybutadiene polymer.

10. The adhesion promoting agent according to claim 1, wherein the functionality of the hydrocarbon polymer (ii) which is reacted with the functionality of the halogenated polyolefin polymer (i) is selected from the group consisting of hydroxyl, amine, carboxylic acid, epoxy, isocyanate, amide, and mercaptan.

11. The adhesion promoting agent according to claim 10, wherein the functionality of the hydrocarbon polymer (ii) which is reacted with the functionality of the halogenated polyolefin polymer (i) comprises hydroxyl functionality.

12. The adhesion promoting agent according to claim 1, wherein the hydrocarbon polymer (ii) comprises a substantially saturated polybutadiene polymer and the at least one reactive functionality of the hydrocarbon polymer (ii) is selected from the group consisting of hydroxyl, amine, carboxylic acid, epoxy, and isocyanate.

13. A method of promoting the adhesion of a coating formed from a liquid or powder coating composition to a polymeric substrate, comprising the steps of:
 (a) providing an adhesion promoting agent comprising a graft copolymer comprising the reaction product of:
  (i) a halogenated polyolefin polymer having at least one reactive functionality; reacted with
  (ii) a substantially saturated hydrocarbon polymer having more than one reactive functionality, at least one reactive functionality of the hydrocarbon polymer reacted with the reactive functionality of the halogenated polyolefin polymer (i) such that the hydrocarbon polymer is grafted onto the polyolefin polymer to form the graft copolymer; and
 (b) adding the adhesion promoting agent to a liquid or powder coating composition.

* * * * *